United States Patent [19]

Morisaki

[11] Patent Number: 5,023,731
[45] Date of Patent: Jun. 11, 1991

[54] MAGNETIC RECORDING AND PLAYBACK APPARATUS

[75] Inventor: Kazuhiko Morisaki, Yokohama, Japan

[73] Assignee: Victor Company of Japan, Ltd., Yokohama, Japan

[21] Appl. No.: 311,067

[22] Filed: Feb. 16, 1989

[30] Foreign Application Priority Data

Feb. 18, 1988 [JP] Japan .................................. 63-36381

[51] Int. Cl.$^5$ ........................ G11B 15/14; G11B 27/36
[52] U.S. Cl. ......................................... 360/64; 360/31
[58] Field of Search ................................... 360/31, 64

[56] References Cited

U.S. PATENT DOCUMENTS

| | | | |
|---|---|---|---|
| 4,591,924 | 5/1986 | Miura et al. | 360/64 |
| 4,628,373 | 12/1986 | Takahashi et al. | 360/62 |
| 4,796,105 | 1/1989 | Mawatari | 360/64 |
| 4,905,104 | 2/1990 | Okamoto et al. | 360/70 |

Primary Examiner—Aristotelis M. Psitos
Assistant Examiner—Won Tae C. Kim
Attorney, Agent, or Firm—Fleit, Jacobson, Cohn, Price, Holman & Stern

[57] ABSTRACT

A magnetic recording and playback apparatus comprises a rotary drum (5) having a center of rotation inclined to the running direction of a magnetic recording tape (7), a group of first and second channel recording heads (1,3) and a group of first and second channel playback heads (2,4) mounted on an outer periphery of the rotary drum (5) at an angular interval of substantially 90 degrees, the positions of the recording and playback heads alternating along the outer periphery. The axial distance between the recording head group and the playback head group is set to a value of approximately 7/4 times the track pitch Tp of consequently formed tracks. The first and second channel recording heads alternately form first and second tracks in sequence on the magnetic recording tape, and after the second track is formed by the second recording head, a recorded signal on the first track is outputted by being traced with the first channel playback head.

4 Claims, 7 Drawing Sheets

TRACING PATTERN OF
PLAYBACK HEAD 2

MAGNETIC RECORDING AND PLAYBACK APPARATUS

BACKGROUND OF THE INVENTION

This invention relates to a magnetic recording and playback apparatus capable of carrying out simultaneous monitoring at the time of recording, which is adapted to record Pulse Code Modulation (PCM) signal while obliquely forming tracks on a magnetic tape by means of rotary heads at a predetermined time interval.

There is generally known a spherical scan type magnetic recording and playback apparatus called a Digital Audio Tape recorder (DAT) constituted to sequentially record pulse code modulated audio signals, etc. on a magnetic tape by means of a plurality of rotary magnetic heads.

With DAT, PCM signals obtained by applying pulse code modulation to information to be recorded are recorded on a tape conforming to an Industry Standard. After such PCM signals are subjected to recording signal processing such as time compression, they are recorded while obliquely forming signal tracks on a magnetic tape by means of rotating two magnetic heads with no guard band being formed between tracks.

The above mentioned two magnetic heads used in the recording are such that a head for A channel of plus (+) azimuth (A head) and a head for B channel of minus (−) azimuth (B head) are mounted or affixed and arranged on the rotary drum so as to form an angular interval of 180 degrees to each other. These heads are commonly used for recording and playback. Each head gap width (hw) is 1.5 times larger than the track pitch (Tp).

The recording of PCM signals with the abovedescribed DAT having A and B heads is conducted as follows.

First, according to the Industry Standard and as shown in FIG. 3, a signal track (n−2 track) of the A channel having a track width 1.5 times larger than the track pitch (Tp) is formed by the A head. Then, a signal track (n−1 track) of the B channel having a width 1.5 times larger than the track pitch Tp is newly formed by the B head so as to overwrite the one third (⅓) portion (0.5 times larger than the track pitch (Tp)) of the upper side of the n−2 track. As a result, an n−2 track having a nominal track width which is equal to the track pitch (Tp) and two thirds (⅔) of the track width initially formed, remain formed on the tape.

Then, an n track of A channel having a track width 1.5 times larger than the track pitch (Tp) is newly formed by the A head so as to overwrite the one third (⅓) (0.5 times larger than the track pitch (Tp)) of the upper side of the n−1 track. As a result, a normal n−1 track having a nominal track width equal to the track pitch (Tp) and two thirds (⅔) of the track width initially formed, remain formed on the tape.

At times subsequent thereto, the above-described normal A and B tracks will be alternately formed in succession on the magnetic tape.

The track pattern recorded here includes various kinds of signals in addition to the above-described PCM signal. Namely, as shown in the well known Automatic Track Finding (ATF) track pattern of DAT (e.g., p. 37, the March 1987 issue of "Electronics Life" published by Japan Broadcasting Publishing Association), a pilot signal $f_1$ (130.67 KHz), timing signals $f_2$ (522.67 KHz) and $f_3$ (784.00 KHz), and an erasing signal $f_4$ (1.568 KHz) are recorded in the longitudinal direction of the track before and after the PCM signal, with it being as a center.

The reproduction or playback of the magnetic tape on which the above-described tracks are recorded, will be conducted as follows.

When A head (B head) traces A track (B track), the A head (B head) senses a crosstalk component of the pilot signal $f_1$ recorded on the adjacent B track (A track) to generate a tracking error signal (ATF signal) derived from the signal $f_1$, by using the ATF signal, a rotational phase control of a capstan for transporting the magnetic tape by a predetermined amount to control a degree of transportation of the magnetic tape so that the A head (B head) traces the central portion of the A track (B track). Thus, a reproduced PCM signal with extremely less crosstalk components can be obtained satisfactorily by two magnetic heads with the azimuth effect.

However, when recording the PCM signal, the DAT of the above arrangement is unable to monitor its recording performance while the recording is taking place. One of the conceivable arrangements directed to this problem is that the rotary drum, a total of four rotary magnetic heads of an A channel recording head (first channel recording head), an A channel playback head (first channel playback head), a B channel recording head (second channel recording head), and a B channel playback head (second channel playback head) are positioned at predetermined angular intervals and axial distances along on rotary axis of the rotary drum.

The four magnetic heads used here are the A channel recording head of plus (+) azimuth, the A channel playback head of plus (+) azimuth, the B channel recording head of minus (−) azimuth, and the B channel playback head of minus (−) azimuth. The azimuth angles of the respective channels are different from each other.

FIGS. 1 and 2 are a plan view and a front view showing a sliding contact between the magnetic heads and the magnetic tape in the conceivable magnetic recording and playback apparatus of the above arrangement. FIG. 3 is a view showing the playback head trace pattern of the conceivable magnetic recording and playback apparatus.

As shown in FIG. 1, an A channel recording head (an A recording head) 1, an A channel playback head (an A playback head) 2, a B channel recording head (a B recording head) 3, and a B channel playback head (a B playback head) 4 are mounted onto a rotary drum 5 in clockwise order at an angular interval of 90 degrees between respective heads. When the rotary drum 5 rotates, respective heads 1 to 4 slidably become in contact with a magnetic tape 7 which is wrapped around the rotary drum 5 in an angular range of substantially 90 degree, with being pressed onto the rotary drum 5 by loading poles 6 and 6. In FIG. 1, symbols R and S denote the rotational direction of the rotary drum 5 and the direction of movement of the magnetic tape 7, respectively.

The four magnetic heads 1 to 4 used here, have an azimuthal relationship such that the A recording head 1, the A playback head 2, the B recording head 3 and the B playback head 4 have plus (+), plus (+), minus (−) and minus (−) azimuthal polarities, respectively, wherein the azimuth angles of the respective channels are different from each other. The head gap width hw of each head is 1.5 times larger than the track pitch Tp.

As shown in FIG. 2, the rotary drum 5 is composed of an upper drum (first drum) 8 and a lower drum (second drum) 9, and the A playback head 2 is mounted or affixed on the lower end of the upper drum 8 of the rotary drum 5. The A recording head 1 is affixed at a position spaced higher from this by an axial distance d1. Similarly, the B playback head 4 is affixed on the lower end of the upper drum 8 and the B recording head 3 is affixed at a position spaced higher from this by the axial distance d1.

The axial distance d1 is set as follows. Namely, as shown in FIG. 3, the axial distance between the A recording head 1 and the A playback head 2 is set so that right after the A track (n) is formed the A playback head 2 traces A track (n) covering partially the area thereof limited to lower ⅜, and picking up a recorded signal correspondingly. When this monitoring takes place, the upper ⅓ of the track n is not yet erased or overwritten by the subsequent track n+1 (not shown). This causes an undesirable amplitude fluctuation of the picked up signal because of a fact that the A playback head 2 has an inherent tracing deviation in a transverse direction of track when tracing thereof so that the covered area of the track n by the gap of the A playback head 2 is not always uniform but irregular along the track n.

The same is true with the B playback head 4.

Accordingly, the above-described conceivable magnetic recording and playback apparatus has a capability of simultaneous monitoring of PCM signals recorded on the A and B channel tracks having the normal track pitch Tp, but has the problem of amplitude fluctuation in the monitored signal making the monitoring system less reliable.

SUMMARY OF THE INVENTION

An object of this invention is to provide a magnetic recording and playback apparatus capable of carrying out an extremely high accuracy recording/playback by simultaneously monitoring of the PCM signals recorded in a form of plurality of tracks with the normal track pitch, which tracks consists of two (A, B) channels.

To achieve this object, this invention provides a magnetic recording and playback apparatus comprising, on the outer peripheral surface of a rotary drum, recording head means for recording a recording signal comprising a PCM signal and a pilot signal on a magnetic recording medium, and playback head means for reproducing the recording signal from the medium, characterized in that the recording head means is composed of the two recording heads of the first and second channels provided at positions spaced angularly to each other by 180 degrees, respectively, and having azimuth angles different from each other, that the playback head means is composed of the two playback heads of the first and second channels provided at positions spaced angularly to each other by 180 degrees, respectively, and having azimuthal angles different from each other, that these four recording and playback heads are mounted or affixed onto the outer peripheral surface of a first drum constituting the rotary drum in the order of the first recording head, the second playback head, the second recording head, and the first playback head in the direction opposite to the rotational direction at the time of recording and playback of the rotary drum, and that the axial distance with respect to a rotary axis of the rotary drum between the first playback and recording heads and the axial distance between the second playback and recording heads measured in the same direction as the above is set to a value approximately 7/4 times the track pitch.

With the magnetic recording and playback apparatus constituted as above, at the same time when the first and second recording heads are recording information while forming tracks in succession, the first and second playback heads can reproduce information recorded on respective tracks. Thus, simultaneous monitoring can be carried out.

DESCRIPTION OF THE PREFERRED EMBODIMENTS

Preferred embodiments of a magnetic recording and playback apparatus according to this invention, will now be described in detail with reference to the accompanying drawings.

Figure 1:
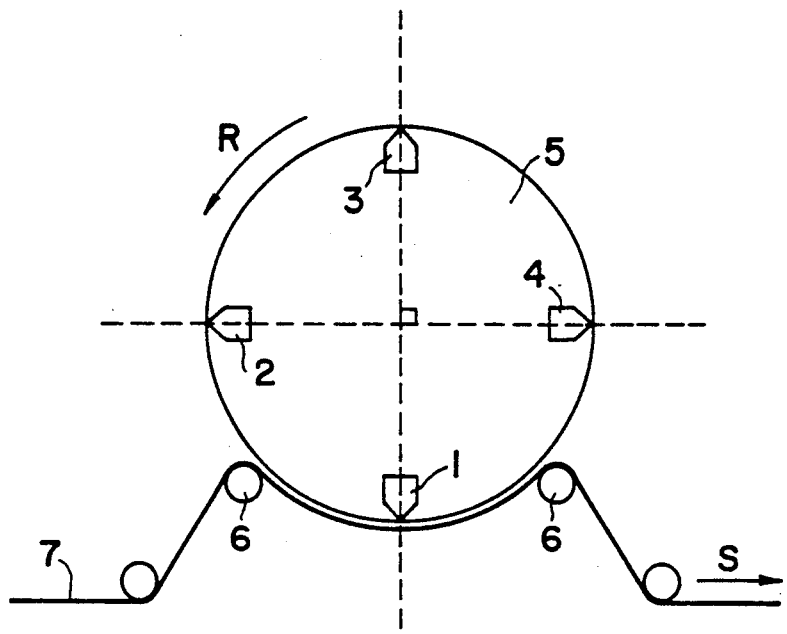
FIGS. 1 and 2 are a plan view and a front view, respectively, showing the sliding contact between the magnetic heads and the magnetic tape in a conceivable magnetic recording and playback apparatus, respectively.
Figure 2:
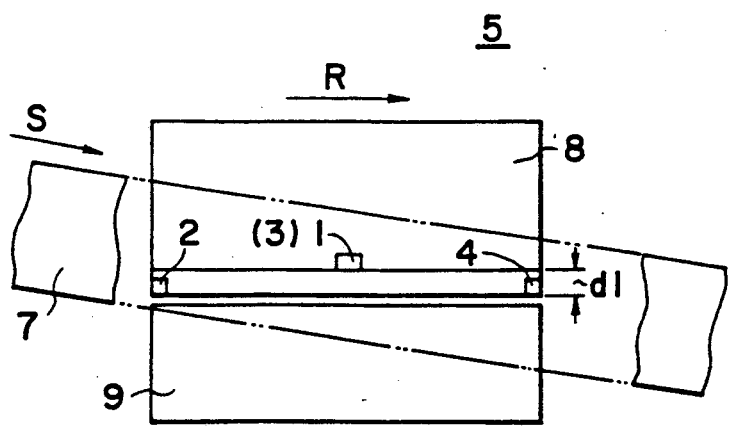
Figure 3:
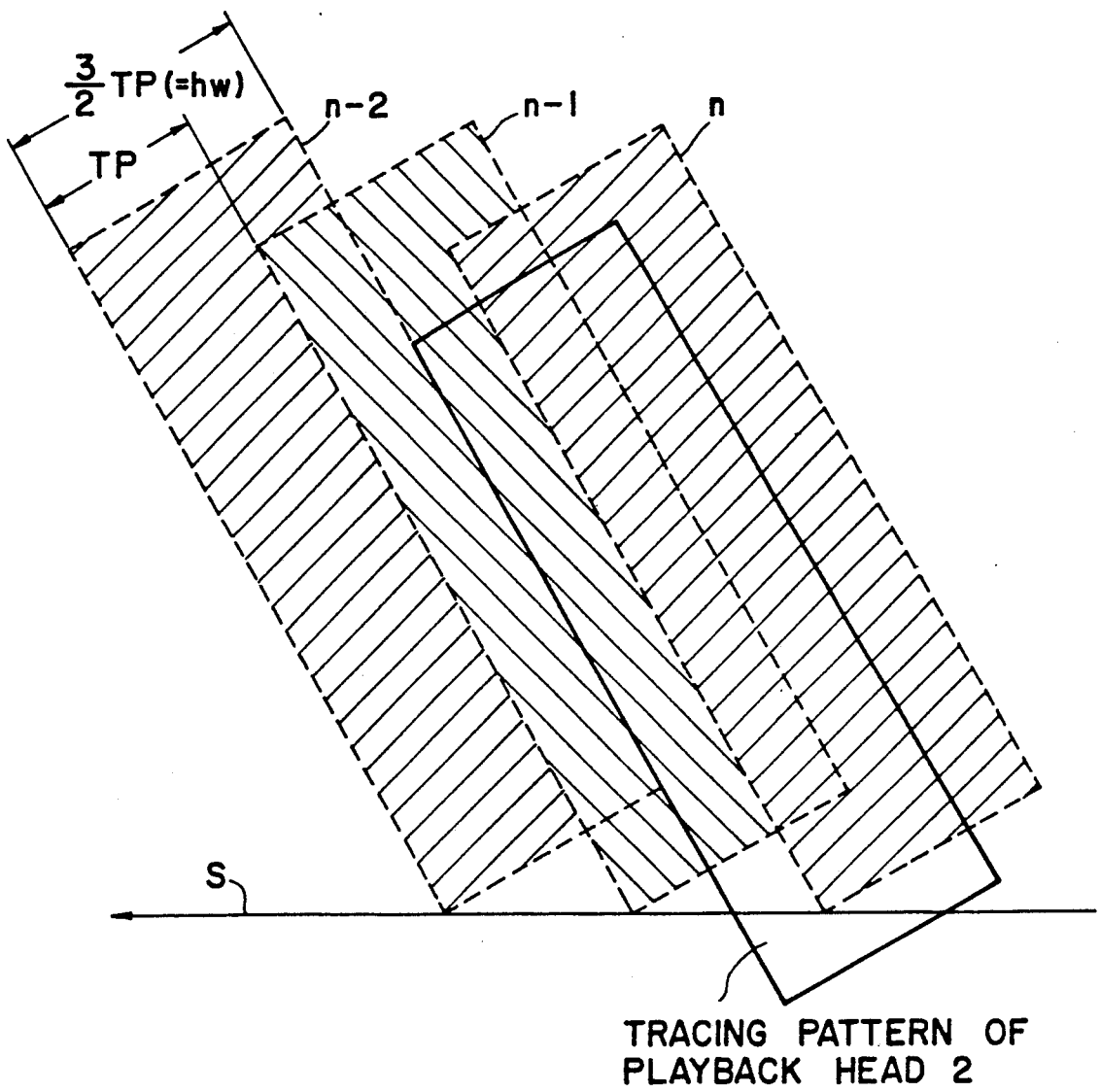
FIG. 3 is a view showing the playback head trace pattern of the conceivable recording and playback apparatus.
Figure 4:
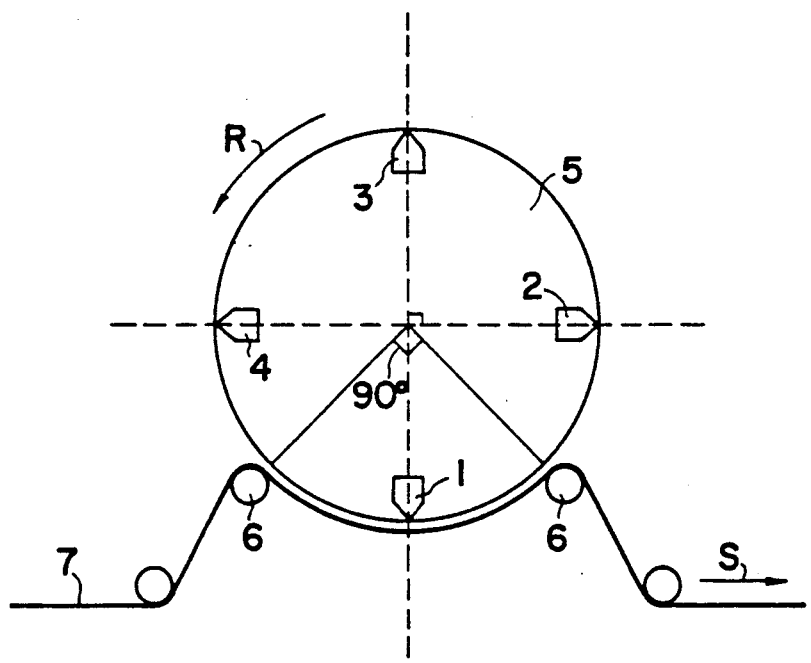
FIG. 4 is a plan view showing the essential part of a first embodiment of a magnetic recording and playback apparatus according to this invention.
Figure 5:
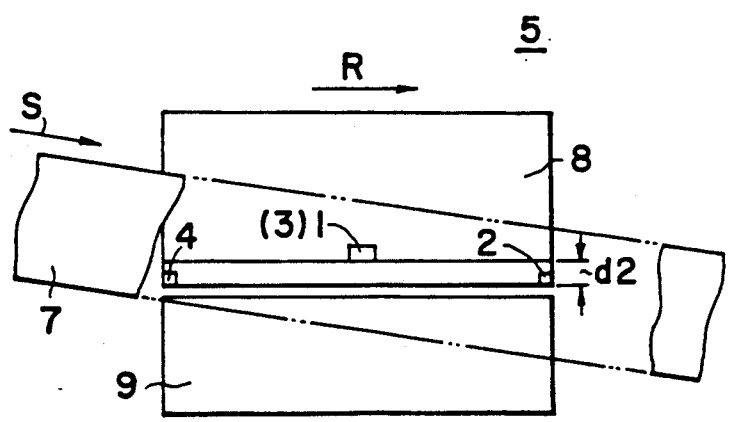
FIG. 5 is a front view showing the essential part of the first embodiment shown in FIG. 4.
Figure 6:
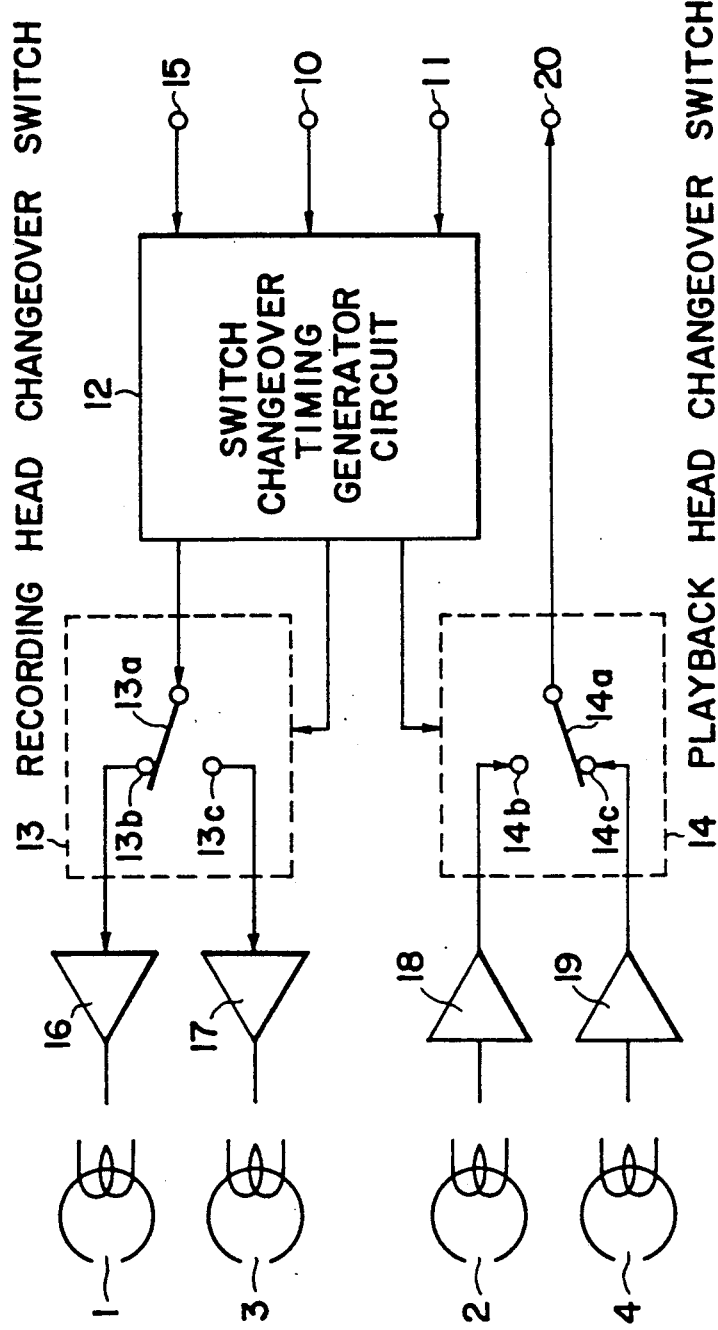
FIG. 6 is a block diagram showing a recording and playback circuit associated with the recording and playback heads of the magnetic recording and playback apparatus according to this invention.
Figure 7:
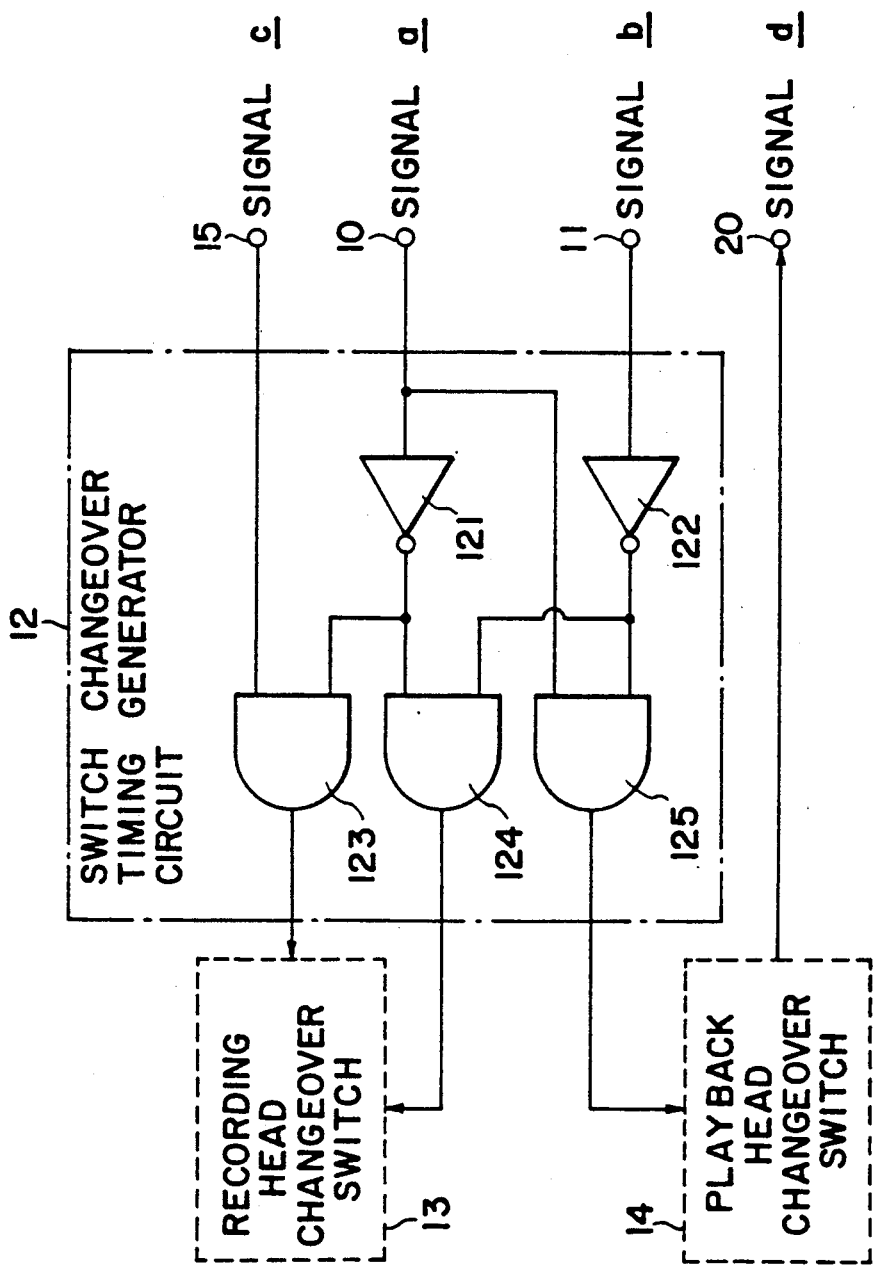
FIG. 7 is a logic circuit diagram showing the detailed arrangement of a timing generation circuit shown in FIG. 6.
Figure 8:
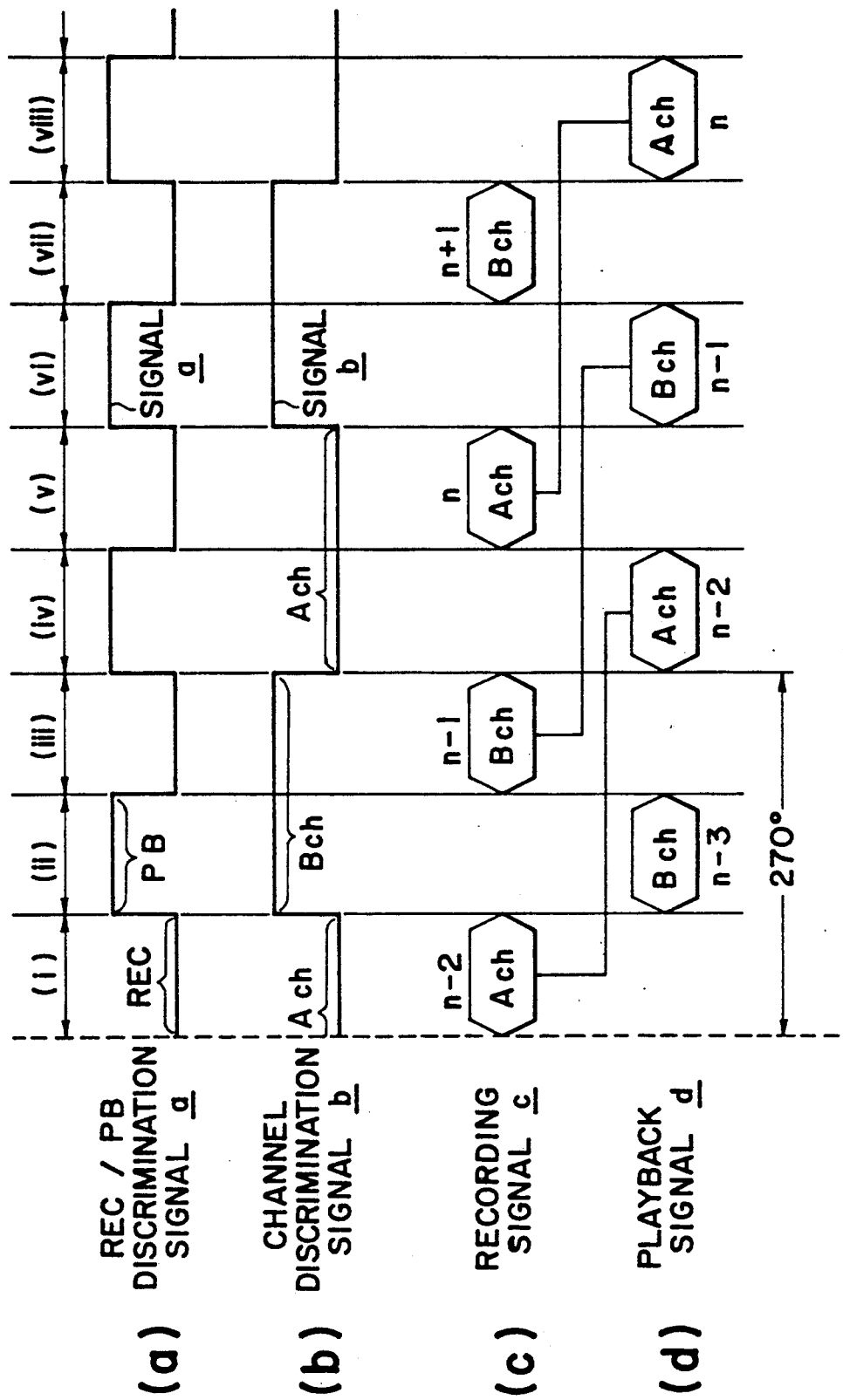
FIG. 8 is a timing chart of the recording and playback circuit shown in FIG. 6.
Figure 10:
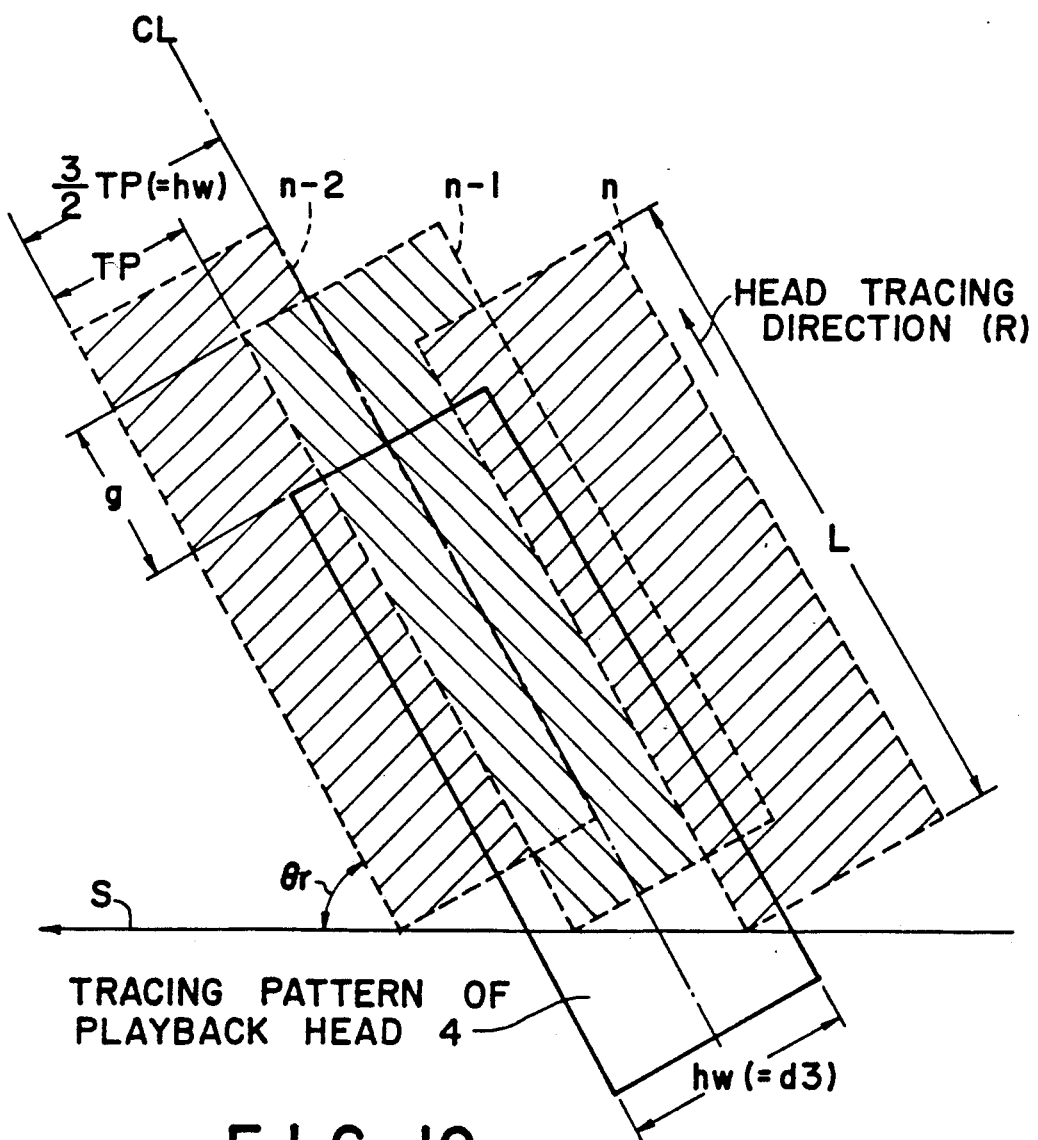
FIG. 10 is a view showing a playback head trace pattern of the magnetic recording and playback apparatus according to this invention.

FIG. 4 is a plan view showing the essential part of a first embodiment of a magnetic recording and playback apparatus according to this invention, FIG. 5 is a front view showing the essential part of the first embodiment shown in FIG. 4, FIG. 6 is a block diagram showing a recording and playback circuit associated with recording and playback heads of a magnetic recording and playback apparatus according to this invention, FIG. 7 is a logic circuit diagram showing the detailed arrangement of a timing generator circuit shown in FIG. 6, FIG. 8 is a timing chart of the recording and playback circuit shown in FIG. 6, and FIG. 10 is a view showing a playback head trace pattern of the magnetic recording and playback apparatus according to this invention. The same components as those described above are designated by the same reference numerals, respectively, and their explanation will be omitted.

As shown in FIG. 4, the magnetic heads constituting the essential part of a first embodiment of a magnetic recording and playback apparatus according to this invention are such that the A recording head 1, the B playback head 4 having a same head gap azimuth angle as one of the B recording head 3, the B recording head 3, and the A playback head 2 having a same head gap azimuth angle as one of the A recording head 1 but opposite to one of the B recording head 4 are mounted in order recited onto the rotary drum 5 in a direction opposite to the rotation direction R of the rotary drum 5 so that an angular interval of 90 degrees each is formed between adjacent heads. When the rotary drum 5 rotates, respective heads 1, 4, 3 and 2 successively come into sliding contact with the magnetic tape 7 pressed onto the rotary drum 5 by loading poles 6. The head gap width hw of each of heads 1 to 4 is 1.5 times the track pitch Tp.

Moreover, as shown in FIG. 5, the rotary drum 5 is composed of the upper drum 8 and the lower drum 9 and the A playback head 2 is mounted on the lower end of the upper drum 8 of the rotary drum 5. Furthermore, the A recording head 1 is mounted at a position higher from the head 2 by an axial distance d2 along the rotary axis of the drum 5. Similarly, the B playback head 4 is mounted on the lower end of the upper drum 8 and the B recording head 3 is affixed at a position higher from the head 4 by the axial distance d2.

Referring to FIG. 10. the A recording head 1 and the B recording head 3 alternately form tracks on the tape 7 in the order of tracks n−2, n−1, n, . . . one after another partly overwriting an immediately preceding track starting from the track n−2 by the A recording head 1. The B playback head 4 is so positioned as such a manner that the B playback head 4 traces the track n−1 as shown with a solid line in FIG. 10 after the track n is written by the A recording head 1. It should be noted that the track n−1, after the formation of the adjacent track n, has a nominal track width equal to the track pitch Tp and the axial distance d2 for the B playback head 4 is selected so that a center of a gap width thereof agrees with a center line CL of the consequently formed track n−1. And an azimuth angle of the head gap of the B playback head 4 is selected to agree with a recorded track's(n−1) azimuth angle and opposite to the azimuth angles of the two adjacent tracks n−2 and n thereby the reproduced signal from the B playback head is substantially limited to a recorded signal on the consequently formed track n−1 when tracing thereof.

The same is true with the A playback head 2 which traces the consequently formed track n−2 with an agreeing azimuth angle therebetween after the track n−1 is written by the B recording head 3.

The axial distance between the A recording head 1 and the A playback head 2 and the axial distance between the B recording head 3 and the B playback head 4 are equal to each other.

As previously described, since the head gap width hw of each of heads 1 to 4 is 1.5 times the track pitch Tp which is equal to the nominal track width of the consequently formed tracks, the spacing distance d2 in the drum axis (rotary axis) direction is set as follows:

$$d2 \approx 7/4 \cdot Tp \qquad (1),$$

where Tp is a nominal track pitch.

For the purpose of carrying out recording and playback operation as explained in the foregoing, the recording and playback heads 1 to 4 are timely switched by a recording and playback circuit shown in FIG. 6.

In this figure, a switch changeover timing generator circuit 12 is provided with an input terminal 10 to which a recording/playback (Rec/Pb) discrimination signal (a signal a shown in FIG. 8(a)) is applied, and an input terminal 11 to which a channel discrimination signal (a signal b shown in FIG. 8(b)) is applied. Thus, the switch changeover timing generator circuit 12 effects a switching control of a recording head changeover switch 13 and a playback head changeover switch 14 on the basis of these signals a and b.

The detailed arrangement of the switch changeover timing generator circuit 12 will be described in conjunction with FIG. 7. The timing generator circuit 12 comprises a NOT circuit 121 connected to the input terminal 10 for signal a to negate the input state of the signal a to output it, a NOT circuit 122 connected to the input terminal 11 for signal b to negate the input state of the signal b to output it, an AND circuit 123 for providing the logical product of an output from the NOT circuit 121 and a recording signal delivered to an input terminal 15, an AND circuit 124 for inputting respective outputs from the NOT circuits 121 and 122 to perform an operation of the logical product thereof to supply an output obtained by that operation to the recording head changeover switch 13, and an AND circuit 125 for inputting the signal a and the output from the NOT circuit 122 to perform an operation of the logical product thereof to supply an output obtained by that operation to the playback head changeover switch 14.

As shown in FIG. 6, the recording head changeover switch 13 includes a movable contact 13a to which a recording signal (signal shown in FIG. 8) delivered from the recording signal processing circuit to the input terminal 15 is applied, a fixed contact 13b connected to the A channel recording head 1 through a recording amplifier 16, and a fixed contact 13c connected to the B channel recording head 3 through a recording amplifier 17. Furthermore, the playback head changeover switch 14 includes a movable contact 14a, a fixed contact 14b connected to the A channel playback head 2 through a playback amplifier 18, and a fixed contact 14c connected to the B channel playback head 4 through a playback amplifier 19, wherein the movable contact 14a is connected to an output terminal 20 for outputting a playback signal (signal d shown in FIG. 8(d)) to a playback signal processing circuit (not shown).

It is needless to say that while the recording head changeover switch 13 and the playback head changeover switch 14 are expressed as mechanical switches in the above-mentioned example, respectively, each may be constructed as an electronic switch.

Initially, referring to FIGS. 7 and 8, the operation of the switch changeover timing generator circuit 12 will be generally described. In the input state of the respective signals shown in FIG. 8, only in the cases of (i) and (v) where the signals a and b are at a low level and the signal c is a signal of A channel, the output of the AND circuit 124 becomes high level. As a result, the movable contact 13a of the recording head changeover switch 13 is controlled to be connected to the fixed contact 13b side. Thus, as the output of the NOT circuit 121 becomes high to make the AND circuit 123 enable a recording signal of A channel is delivered to the A channel recording head 1 through the amplifier 16. On the other hand, in the cases of (iii) and (vii) where the signal a is at a low level, the signal b is at a high level, and the recording signal c is a signal of B channel, the output of the NOT circuit 122 becomes low, and the output of the NOT circuit 121 becomes high making the AND circuit 123 enable. As a result, the output of the AND circuit 123 becomes the B channel signal and the output of the AND circuit 124 shifts to low level, which causes the movable contact 13a being connected to the fixed contact 13c, so that a recording signal of B channel is delivered to the B channel recording head 3 through the amplifier 17. In a manner stated above, switching of the recording amplifiers 16 and 17 together with the respective heads 1 and 3 is carried out.

The switching of the playback amplifiers 18 and 19 will be now described. In the cases of (iv) and (viii) where the signal a is at a high level and the signal b is at a low level, the input statements of the AND circuit 125 both shift to high level because the NOT circuit 122 inverts the signal b. Thus, a high level output signal from the AND circuit 125 is delivered to the playback head changeover switch 14, causing the movable contact 14a of the switch 14 being connected to the fixed contact 14b. As a result, a playback signal d from the A channel playback head 2 is taken out of a demodulation circuit. In the cases of (ii) and (vi) where the discrimination signal a is at a high level, i.e., in playback or reproduction mode and the signal b is also at a high level, i.e., in the state of B channel, this causes that an output of low level is delivered to the playback head changeover switch 14, the movable contact 14a of the switch 14 is connected to the fixed contact 14c side. As a result, the playback signal from the B channel playback head 4 is taken out of the terminal 20 as the playback signal d.

An explanation of the respective timings of the states (i) to (iv) shown in FIG. 8 regarding the operation of the switch changeover timing generator circuit 12, detailed operations of the entire magnetic recording and playback apparatus will be explained hereinafter.

(I) Case of the state (i) shown in FIG. 8
(Rec/Pb discrimination signal a is in a recording state and the channel discrimination signal b is in an A channel timing state.)

The switch changeover timing generator circuit 12 allows the movable contact 13a of the recording head changeover switch 13 to be connected to the fixed contact 13b, and allows the movable contact 14a of the playback head changeover switch 14 to be connected to the fixed contact 14c.

Thus, the recording signal is delivered to the recording amplifier 16 through the movable contact 13a and the fixed contact 13b, then the signal is amplified. The signal thus amplified is delivered to the A recording head 1.

As a result, the A recording head forms the A channel track (n−2) (illustrated in FIG. 10) while overwriting the upper one third (⅓) of the preceding track (n−3) (not shown) of a B channel formed by the B recording head 3.

(II) Case of the state (ii) shown in FIG. 8
(The Rec/Pb discrimination signal a is in a playback state and the channel discrimination signal b is in a B channel timing state.)

The switch changeover timing generator circuit 12 allows the movable contact 14a of the playback head changeover switch 14 to be connected to the fixed contact 14c, and allows the movable contact 13a of the recording head changeover switch 13 to be connected to the fixed contact 13c.

Thus, the B playback head 4 traces a portion of a B channel track (n−3) (not shown) having the nominal track width equal to the pitch Tp resulted from the operations of the B recording head 3 the A recording head 1 which overwrites on upper one third (⅓) of the preceding track (n−3) in the above-described state (i) to reproduce a PCM signal recorded thereon.

Namely, when the rotary drum 5 is rotated by an angle of 90 degrees in the rotation direction R in the above-described state (i), the B playback head 4 reproduces a PCM signal recorded on the B channel track (n−3) which is preceding the A channel track (n−2) and has the nominal track width equal to the pitch Tp.

As a result, the playback signal obtained from the B playback head 4 is amplified by the playback amplifier 19, and is outputted from the output terminal 20 as the playback signal d to a playback signal processing circuit (not shown) through the fixed contact 14c and the movable contact 14a.

(III) Case of (iii) shown in FIG. 8
(The Rec/Pb discrimination signal a is in a recording state and the channel discrimination signal b is in a B channel timing state.)

The switch changeover timing generator circuit 12 allows the movable contact 13a of the recording head changeover switch 13 to be connected to the fixed contact 13c, and allows the movable contact 14a of the playback head changeover switch 14 to be connected to the fixed contact 14c.

Thus, the recording signal c is delivered to the recording amplifier 17 through the movable contact 13a and the fixed contact 13c, at which that signal is amplified. The signal thus amplified is delivered to the B recording head 3.

As a result, the B recording head 3 forms a B channel track (n−1) while overwriting the upper side one third (⅓) of the preceding track (n−2) of A channel formed by the A recording head 1 (illustrated in FIG. 10).

(IV) Case of the state (iv) shown in FIG. 8
(The Rec/Pb discrimination signal a is in a playback state and the channel discrimination signal b is in an A channel timing state.)

The switch changeover timing generator circuit 12 allows the movable contact 14a of the playback head changeover switch 14 to be connected to the fixed contact 14b, and allows the movable contact 13a of the recording head changeover switch 13 to be connected to the fixed contact 13c.

Thus, the A playback head 2 traces a portion of the A channel track (n−2) having the nominal track width equal to the pitch Tp which has been already formed by the A recording head 1 and overwritten on its upper one third (⅓) of an initially formed track by the B recording head 3 in the above-described state (iii) to reproduce a PCM signal recorded thereon.

Namely, when the rotary drum 5 placed in the state (i) is rotated by an angle of 270 degrees in the rotation direction R, the A playback head 2 can reproduces a PCM signal recorded on the track (n−2) which is preceding the B channel track (n−1) and has the nominal track width equal to the pitch Tp.

As a result, a signal obtained from the A playback head 2 is amplified by the playback amplifier 18, and is then output from the output terminal 20 to a playback signal processing circuit (not shown) through the fixed contact 14b and the movable contact 14a.

Thus, one processing cycle is completed according to the above-described states (i) to (iv).

Similarly, by completing the states (v) to (viii) shown in FIG. 8, the A playback head 2 reproduces a PCM signal (recorded on an A channel track n which is positioned preceding B channel track (n+1) (not shown)

when the rotary drum 5 in the above state (v) is rotated by an angle of 270 degrees and has the nominal track width equal to the pitch Tp).

The magnetic recording and playback apparatus according to this invention produces PCM signals recorded on tracks having the nominal track width and pitch Tp by sequentially repeating the above-described cycle.

The DAT technical specifications for the magnetic recording and playback apparatus according to this invention are prepared for standardization by the DAT Conference. Because the previously described nominal track pitch Tp is about 13.6 μm (precisely 13.591 μm), the spacing distance d2 between the A recording head 1 (B recording head 3) and the A playback head 2 (B recording head 4) is expressed, from the previously described equation, as follows:

$$d2 \approx 23.8 \, (\mu m).$$

Because the head gap width hw of each of heads 1 to is 1.5 times the track pitch Tp, the axial distance d2 may have a certain amount of positional error as a tolerance without causing a tracing problem from a practical point of view. This tolerance being included, the axial distance d2 can be a value d3 within a range described below:

$$d3 \approx 7/4 \cdot Tp \pm \tfrac{1}{4} \cdot Tp \qquad (2),$$

where Tp is a nominal track pitch.

Namely, the axial distance d3 including the tolerance is expressed as follows:

$$d3 \approx 23.8 \pm 3.40 \, (\mu m).$$

In reality, the tape travels a certain distance while the playback head 2 or 4 makes the angular displacement of 270 degrees. This causes the playback head 2 or 4 not coming to contact with the starting edge of the intended track (n−1 for the head 4) but short of the edge as indicated by solid line in FIG. 10. As a result, some data recorded in the ending region of the intended track (n−1) corresponding to a track span g are missed from being monitored. However, the region represented by g is exaggerated in FIG. 10, and according to the previously referred Industry Standards, the PCM sound data are recorded well within the both starting and ending edges of each track, therefore, monitoring at least the PCM sound data is fully possible.

Figure 9:
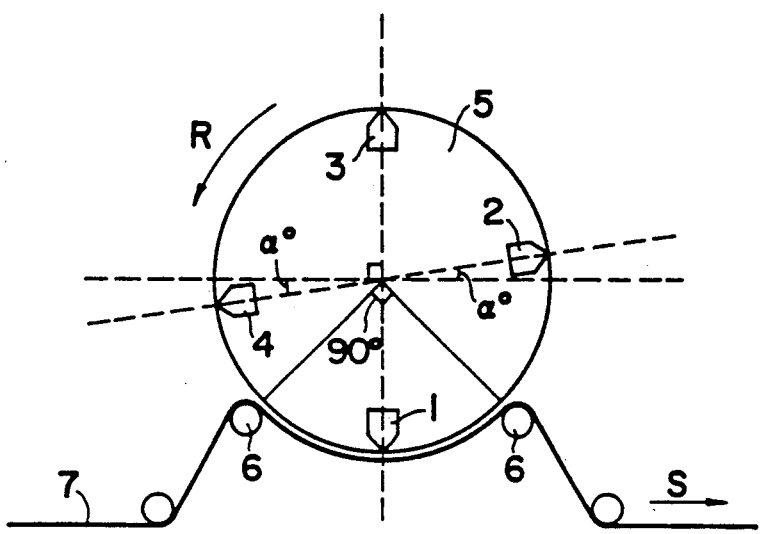
FIG. 9 is a plan view showing the essential part of a second embodiment of a magnetic recording and playback apparatus according to this invention.

If a full-track-length monitoring is desired to monitor the PCM sound data as well as the accompanied pilot signal and so on recorded in the neighborhood of both the starting and the ending edges, a head arrangement shown in FIG. 9 may be adapted.

FIG. 9 shows a second embodiment of a magnetic recording and playback apparatus according to this invention. As shown in this figure, the mounting state is substantially the same as the mounting state of the previously described first embodiment shown in FIG. 4, wherein both the embodiments differ only in angular positions of playback heads 2 and 4 on the rotary drum 5.

By providing an angular shift of u degrees to the two (A, B) playback heads, they come to contact exactly with the track starting edge of the intended track.

Namely, compared to the head arrangement shown in FIG. 4, the A playback head 2 and the B playback head 4 are respectively shifted toward the A recording head 1 and the B recording head 3 by an angle of α degrees in the rotating direction R of the rotary drum as shown in FIG. 9. The mounting positions of the A recording head 1 and the B recording head 3 are the same as the positions shown in FIG. 4.

This angle of α degrees of deviation is expressed as follows:

$$\alpha \approx 135 \, Tp/(L \cdot \tan\theta r) \qquad (3),$$

where Tp is a track pitch, L is a track length and θr is a track angle with respect to the direction of tape movement S (L and θr are illustrated in FIG. 10).

The recording and playback operation of respective heads 1 to 4 mounted on the rotary drum 5 will be conducted as follows.

Since the A playback head 2 (B playback head 4) is mounted at a position closer to the A recording head 1 (B recording head 3) by an angle of c degrees compared to the mounting position shown in FIG. 4, it is obvious that the A playback head 2 (B playback head 4) makes an angular displacement of (270−α) degrees to reach the position of the A recording head 1 (B recording head 3) where it started to slide contact with the magnetic tape 7 to initiate the playback operation.

Since the head gap width hw of each of heads 1 to 4 is 1.5 times the track pitch Tp, the A recording head 1 (B recording head 3) is mounted higher from the A playback head 2 (B playback head 4) by the axial distance d2 as shown in FIG. 5. This axial distance d2 is the same as described before, which is expressed as follows:

$$d2 \approx 7/4 \cdot Tp \qquad (1).$$

In this way, the playback head traces substantially the full length of the intended track having a nominal track width and preceding immediately the track of which a recording is performed lastly. Thus, the recorded data thereon can be monitored satisfactorily. In this condition, the time (phase) delay of the monitored signal with respect to the recording signal is equivalent to 270 degrees rotation of the rotary drum 5.

In very detail in this second embodiment, shown in FIGS. 9 and 10, there still occurs a track portion represented by g not fully traced but a fraction of which remains untraced due to the tape movement. To eliminate this, it is effective to take a measure to extend the wrapping range of the magnetic tape 7 on the rotary drum 5.

According to the Industry Standard to be applied to the DAT magnetic recording and playback apparatus of this invention, the track pitch Tp is about 13.6 μm (precisely, 13.591 μm), the track length L is about 23.5 mm (precisely, 23.501 mm), and the track angle θr is 6°22′59.5″, which lead the angle θ being equal to about 0°42′ (precisely, 0°41′54.1″).

Since the recording and playback circuit and their operation in conjunction with the respective heads 1 to 4 shown in FIG. 9 are the same as the previously described for ones shown in FIGS. 6 to 8, its explanation is omitted here.

As described above, since the magnetic recording and playback apparatus according to this invention can carry out a simultaneous monitoring of the track pattern having nominal track width and pitch, it provides the advantage that a high reliable recording and monitoring can be conducted, and the like.

I claim:

1. In a magnetic recording and playback apparatus including recording head means for recording, while forming tracks in succession on a magnetic recording medium partially wrapped around drum means in an angular range of substantially 90 degrees, a recording signal at least including a pulse code modulated (PCM) signal obtained by applying pulse code modulation to an information signal to be recorded together with pilot signals located before and after said PCM signal on a formed track, respectively, and playback head means corresponding with said recording head means and for tracing said tracks formed on said medium to reproduce said recording signal, said drum means being a rotary drum having a rotary axis inclined at a fixed angle with respect to the running direction of a magnetic recording tape as said medium and having said recording head means and said playback head means mounted on an outer peripheral surface thereof, the improvement wherein:

said recording head means comprises two recording heads of first and second channels at positions angularly spaced to each other by 180 degrees, respectively, and having azimuth angles different from each other, and a gap width wider than a track pitch;

said playback head means comprises two playback heads of the first and second channels at positions angularly spaced to each other by 180 degrees, respectively, and having azimuth angles different from each other but common in corresponding channels to said two recording heads, and a gap width wider than a track pitch;

said first channel recording head, said second channel playback head, said second channel recording head and said first channel playback head are arranged in a recited order along the outer peripheral surface in a direction opposite to a rotating direction of said rotary drum, and have an angular interval of substantially 90 degrees between two adjacent heads of the first channel recording and playback heads and second channel recording and playback heads;

an axial distance of $(7/4) \times Tp$ to the rotary axis of said rotary drum is provided between said recording head means and corresponding playback head means of said channels, where Tp is a normal track pitch of said tracks; and selecting means is provided for selectively supplying the recording signal to said first and second channel recording heads and selectively outputting a signal from said first and second channel playback heads, said selecting means comprising first terminal means to which said recording signal is supplied, second terminal means for outputting a reproduced signal, a changeover timing generator circuit coupled to said first terminal means responsive to a recording and playback discrimination signal, a channel discrimination signal, and a recording signal to switch and control the operation timings by which respective heads record and reproduce said recording signal onto and from said medium, a recording head changeover switch for selecting said first channel recording head and said second channel recording head on the basis of a first output from said generator circuit, first amplifier means for amplifying said recording signal to be supplied to said first and second channel recording heads, second amplifier means for amplifying reproduced signals from said first and second channel playback heads, and a playback head changeover switch for selecting said first channel playback head and said second channel playback head on the basis of a second output from said generator circuit so that said reproduced signals from said first and second channel playback heads are selectively outputted to said second terminal means; and said changeover timing generator circuit comprising:

a first NOT circuit for sending NOT output of a recording and playback discrimination signal input thereto, a second NOT circuit for sending a NOT output of a channel discrimination signal for discriminating between first and second channels input thereto, a first logic circuit for receiving the recording signal from said first terminal means and an output from said first NOT circuit to perform an operation of logical product thereof for passing said recording signal to said recording head changeover switch in a recording mode.

a second logic circuit for receiving outputs from said first and second NOT circuits to perform an operation of logical product thereof to send an output of high or low level for operating said recording changeover switch, so that said recording signal is selectively supplied to said first and second channel recording heads in a recording mode, and a third logic circuit for receiving said recording and playback discrimination signal and said output from said second NOT circuit to perform an operation of logical product thereof to send an output of high or low level for operating said playback head changeover switch so that playback signals from said first and second channel playback heads are selectively supplied to said second terminal means in a playback mode.

2. A magnetic recording and playback apparatus as claimed in claim 1, wherein:

said selecting means and said first and second channel recording heads alternately form a first track and a second track, respectively, and after said second track is formed by said second channel recording head, said first track is traced by said first channel playback head whereby said selecting means outputs the signal therefrom.

3. A magnetic recording and playback apparatus as claimed in claim 2, wherein:

said first and second channel playback heads are angularly shafted by a fraction from 90 degrees respectively toward said first and second channel recording heads, so that said first channel playback head contacts exactly a starting edge of the first track immediately after said second track is formed by said second channel recording head.

4. A magnetic recording and playback apparatus as claimed in claim 1, wherein:

a gap width of each of said first and second channel recording heads and said first and second channel playback heads is 1.5 times said track pitch of said tracks.

* * * * *